United States Patent
Lecomte et al.

(10) Patent No.: US 10,899,652 B2
(45) Date of Patent: Jan. 26, 2021

(54) GLASS FIBERS

(71) Applicant: SAINT-GOBAIN ISOVER, Courbevoie (FR)

(72) Inventors: Emmanuel Lecomte, Nesles la Montagne (FR); Christopher Ellison, Liancourt (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/317,357

(22) PCT Filed: Jul. 12, 2017

(86) PCT No.: PCT/FR2017/000143
§ 371 (c)(1),
(2) Date: Jan. 11, 2019

(87) PCT Pub. No.: WO2018/011478
PCT Pub. Date: Jan. 18, 2018

(65) Prior Publication Data
US 2019/0225532 A1 Jul. 25, 2019

(30) Foreign Application Priority Data

Jul. 13, 2016 (FR) ..................... 16 56757

(51) Int. Cl.
| C03B 37/04 | (2006.01) |
| B01D 39/20 | (2006.01) |
| C03B 37/065 | (2006.01) |
| C03C 3/091 | (2006.01) |
| C03C 13/06 | (2006.01) |
| E04B 1/74 | (2006.01) |

(52) U.S. Cl.
CPC ........ *C03B 37/048* (2013.01); *B01D 39/2017* (2013.01); *C03B 37/065* (2013.01); *C03C 3/091* (2013.01); *C03C 13/06* (2013.01); *E04B 1/74* (2013.01); *C03B 2201/10* (2013.01); *C03B 2201/32* (2013.01); *C03B 2201/40* (2013.01); *C03B 2201/50* (2013.01); *C03B 2205/68* (2013.01); *E04B 2001/742* (2013.01)

(58) Field of Classification Search
USPC .......................................... 428/69
See application file for complete search history.

(56) References Cited

U.S. PATENT DOCUMENTS

| 4,130,487 A | * | 12/1978 | Hunter | B01D 27/06 210/259 |
| 6,261,335 B1 | | 7/2001 | Kern et al. | |
| 6,358,871 B1 | * | 3/2002 | Sircar | B01D 39/2017 442/348 |
| 2002/0081246 A1 | * | 6/2002 | Tsukada | B01D 39/2017 422/186.3 |
| 2003/0000254 A1 | | 1/2003 | Bauer | |
| 2009/0042030 A1 | * | 2/2009 | Douce | C03C 13/00 428/392 |
| 2012/0021295 A1 | * | 1/2012 | Zguris | C03C 3/091 429/247 |
| 2012/0160104 A1 | * | 6/2012 | Vulfson | B01D 39/2082 95/273 |
| 2016/0068428 A1 | * | 3/2016 | Li | C03C 13/00 501/38 |
| 2016/0116100 A1 | * | 4/2016 | Thiery | B32B 15/14 156/60 |

OTHER PUBLICATIONS

International Search Report as issued in International Patent Application No. PCT/FR2017/000143, dated Oct. 13, 2017.
International Preliminary Report on Patentability and the Written Opinion of the International Searching Authority as issued in International Patent Application No. PCT/FR2017/000143, dated Jan. 15, 2019.

* cited by examiner

*Primary Examiner* — Tahseen Khan
(74) *Attorney, Agent, or Firm* — Pillsbury Winthrop Shaw Pittman LLP

(57) ABSTRACT

Glass fibers have a chemical composition that includes the following constituents, in a weight content that varies within the limits defined below: $SiO_2$ 50-70%, $Al_2O_3$ 0-5%, CaO+ MgO 0-7%, $Na_2O$ 5-15%, $K_2O$ 0-10%, BaO 2-10%, SrO 2-10%, ZnO <2%, and $B_2O_3$ 5-15%.

25 Claims, No Drawings

GLASS FIBERS

CROSS-REFERENCE TO RELATED APPLICATIONS

This application is the U.S. National Stage of PCT/FR2017/000143, filed Jul. 12, 2017, which in turn claims priority to French patent application number 1656757 filed Jul. 13, 2016. The content of these applications are incorporated herein by reference in their entireties.

The invention relates the field of glass fibers. It relates more particularly to fibers intended to be incorporated into filters or battery separators or other technical articles, in general in applications where the fibers are present as constituents of paper sheets. Paper is understood within the meaning of the present invention to be webs formed by entanglement of glass fibers obtained by a papermaking process.

Usually, these processes consist in placing glass fibers having the required dimensions in an aqueous suspension or dispersion with suitable additives, coating this liquid preparation on a filter belt, sucking up, by suction means, an excess portion of the liquid phase, where appropriate repeating the step of deposition of aqueous preparation and filtration in order to introduce a quantity of additional fibers, optionally carrying out a pressing operation in order to reduce the thickness of the layer and to extract an additional amount of water and finishing with a phase of drying the fibrous sheet thus formed.

The aforementioned applications require that the glass fibers have a high chemical resistance, in particular to acids. This property is in particular desirable within the context of the manufacture of papers. The wet aging resistance must also be good, in particular when the filters are used for filtering air from clean rooms. It is however important that the fibers are capable of being eliminated rapidly in the physiological fluids of the lung environment in order to prevent the inhalation thereof from causing respiratory diseases.

Other advantageous properties of the fibers also include the mechanical strength, in particular the tensile strength, in order to facilitate the shaping and the subsequent handling of the paper sheets (unrolling, folding, cutting, etc.). The chemical composition of the glass must also be suitable for melting then forming fine fibers, in particular by the flame attenuation fiberizing process, which leads to requirements in terms of viscosity of the glass and liquidus temperature.

The objective of the invention is to propose glass compositions that meet these various requirements.

For this purpose, one subject of the invention is glass fibers, the chemical composition of which comprises the following constituents, in a weight content that varies within the limits defined below:

| | |
|---|---|
| $SiO_2$ | 50-70% |
| $Al_2O_3$ | 0-5% |
| CaO + MgO | 0-7% |
| $Na_2O$ | 5-15% |
| $K_2O$ | 0-10% |
| BaO | 2-10% |
| SrO | 2-10% |
| ZnO | <2% |
| $B_2O_3$ | 5-15%. |

Throughout the whole of the present text, the contents are expressed as weight percentages.

The $SiO_2$ content is preferably within a range extending from 55% to 68%, in particular from 60% to 67%. Contents that are too high lead to viscosities that are too high, which will be detrimental to the melting of the glass and also to its ability to be suitably fiberized.

The $Al_2O_3$ content is preferably within a range extending from 1% to 4%, in particular from 1.5% to 2.5%. Its presence results in the wet aging resistance of the glass and the tensile strength being increased. Contents that are too high are however capable of increasing the biopersistence of the fibers in the lungs.

The sum of the contents of CaO and MgO (denoted CaO+MgO) is preferably within a range extending from 2% to 6%, in particular from 2.5% to 5%. The CaO content is preferably within a range extending from 1% to 4%, in particular from 1.5% to 3%. The MgO content is preferably within a range extending from 1% to 3%, in particular from 1% to 2%. The presence of these two alkaline-earth metal oxides makes it possible to facilitate the melting of the glass, but a high content may increase the liquidus temperature and therefore negatively impact the fiberizing of the glass.

The $Na_2O$ content is preferably within a range extending from 6% to 12%, in particular from 7% to 10%. The $K_2O$ content is preferably within a range extending from 1% to 7%, in particular from 2% to 5%. The presence of these alkali metal oxides also makes it possible to facilitate the melting of the glass, but high contents lead to a degradation of the wet strength.

The BaO content is preferably within a range extending from 3% to 8%, in particular from 3% to 6%.

The SrO content is preferably within a range extending from 2% to 5%, in particular from 2% to 4%. This oxide has proved particularly beneficial in that it helps to reduce the biopersistence of the fibers without adversely affecting the resistance to acids and the wet aging resistance.

The ZnO content is advantageously at most 1%, in particular is zero, with the exception of undesirable impurities.

The $B_2O_3$ content is preferably within a range extending from 8% to 13%, in particular from 9% to 12%. This oxide has a positive effect as regards the biopersistence of the fibers.

It goes without saying that the various preferred ranges described above may be combined freely with one another, the various combinations not all being able to be listed for reasons of conciseness.

Preferably, the total content of $SiO_2$, $Al_2O_3$, CaO, MgO, $Na_2O$, $K_2O$, BaO, SrO and $B_2O_3$ is at least 95%, in particular 97% and even 98% or 99%.

Other components may be present in the chemical composition of the fiber according to the invention, either intentionally, or as impurities present in the raw materials or originating from the refractory materials of the furnace. They may be in particular $SO_3$, originating from the addition of sodium or calcium sulfate as glass refining agent. They may also be iron or titanium oxides, present as impurities of many raw materials. They may also be fluorine ($F_2$), which facilitates the melting of the glass, or zirconium oxide ($ZrO_2$), which improves the mechanical strength of the fibers.

Some preferred combinations are described below.

According to one preferred embodiment, the glass fibers have a chemical composition that comprises the following constituents, in a weight content that varies within the limits defined below:

| | |
|---|---|
| $SiO_2$ | 55-68% |
| $Al_2O_3$ | 1-4% |
| CaO | 1-4% |
| MgO | 1-3% |
| $Na_2O$ | 6-12% |
| $K_2O$ | 1-7% |
| BaO | 3-8% |
| SrO | 2-5% |
| ZnO | <1% |
| $B_2O_3$ | 8-13%. |

According to one particularly preferred embodiment, the glass fibers have a chemical composition that comprises the following constituents, in a weight content that varies within the limits defined below:

| | |
|---|---|
| $SiO_2$ | 60-67% |
| $Al_2O_3$ | 1.5-2.5% |
| CaO | 1.5-3% |
| MgO | 1-2% |
| $Na_2O$ | 7-10% |
| $K_2O$ | 2-5% |
| BaO | 3-6% |
| SrO | 2-4% |
| ZnO | 0 |
| $B_2O_3$ | 9-12%. |

The chemical composition of the glass fibers according to the invention is preferably such that the temperature at which the glass has a viscosity of 1000 poise (1 poise=0.1 Pa·s) is at most 1200° C., preferably at most 1150° C. and even at most 1100° C. In this way, the composition of the fibers is perfectly suitable for flame attenuation fiberizing.

The mean diameter of the fibers according to the invention is preferably within a range extending from 0.1 to 3 μm, in particular from 0.2 to 2 μm.

Another subject of the invention is a process for manufacturing glass fibers according to the invention, comprising a step of melting a glass having substantially the same chemical composition as that of said fibers, then a fiberizing step.

The melting step makes it possible to obtain a molten glass bath from a batch mix.

The batch mix comprises various natural and/or artificial raw materials, for example silica sand, feldspars, sodium carbonate, borax, strontium carbonate, etc.

The melting step may be carried out in various known ways, in particular by melting in a fuel-fired furnace or by electric melting.

The fuel-fired furnace comprises at least one overhead burner (the flames are positioned above the glass bath and heat it via radiation) or submerged burner (the flames are created directly within the glass bath). The or each burner may be supplied by various fuels such as natural gas or fuel oil.

"Electric melting" is understood to mean that the glass is melted by the Joule effect, by means of electrodes submerged in the glass bath, with exclusion of any use of other heating means, such as flames. The batch mix is normally distributed uniformly over the surface of the glass bath with the aid of a mechanical device, and thus constitutes a heat shield that limits the temperature above the glass bath, so that the presence of a superstructure is not always necessary. The electrodes are submerged in the molten glass. They may be suspended so as to drop into the glass bath from above, be installed in the hearth, or else be installed in the sidewalls of the tank. The first two options are generally preferred for large-sized tanks in order to distribute the heating of the glass bath as best possible. The electrodes are preferably made of molybdenum, or even optionally made of tin oxide. The molybdenum electrode preferably passes through the hearth via a water-cooled steel electrode holder.

The fiberizing is preferably carried out by flame attenuation.

Flame attenuation fiberizing consists in subjecting glass yarns to a high velocity flame. The yarns are stretched mechanically from a bushing containing the molten glass, then picked up by the flame from a burner, said flame preferably developing perpendicularly to the direction of the yarn. The bushing is preferably equipped in its lower part with a multiplicity of orifices through which primary filaments are formed, then collected so as to form the glass yarns.

According to one embodiment, the fiberizing step may be carried out directly using the molten glass obtained by the melting step. According to another embodiment, the molten glass is first shaped in the form of beads, which are then re-melted in the bushing in order to form the molten glass which is then subjected to the fiberizing step.

The fiberizing may also be carried out by other processes, in particular by internal centrifugation.

Internal centrifugation fiberizing consists in introducing a molten glass stream into a spinner, also referred to as a fiberizing spinner, rotating at high speed and pierced around its periphery by a very large number of orifices through which the glass is ejected in the form of filaments under the effect of the centrifugal force. These filaments are then subjected to the action of an annular high-temperature high-velocity attenuating stream which is produced by a burner which hugs the wall of the spinner, which stream attenuates said filaments and converts them into fibers. The fibers formed are entrained by this attenuating gas stream to a receiving device.

Another subject present invention is a sheet of paper or a web comprising fibers according to the invention.

This sheet of paper may be produced by any known process, in particular by the "papermaking" process, that consists in dispersing the fibers in an aqueous medium, which is generally acidic, in depositing the fibers on a table by the effect of a vacuum, then in drying the sheet obtained.

The web is typically a nonwoven web of glass fibers obtained by the dry-laid technique, in which fibers from aerodynamic fiberizing, flame attenuation fiberizing or centrifugal fiberizing are collected on a receiving member and shaped into a thin sheet. Nonwovens are distinguished from paper-type substrates in that they comprise relatively long fibers, whereas the fibers used for paper are shorter, typically having a length of less than 5 mm.

Another subject of the invention is also a filter or a battery separator comprising at least one sheet of paper according to the invention. The filter is in particular a filter of HEPA (High Efficiency Particulate Air) type, and is in particular at least class H12 within the meaning of the NF EN 1822 standard.

Another subject of the invention is an insulation panel core, formed by the superposition of a plurality of sheets of paper or webs described above.

This core structure may be used to form insulation panels. Another subject of the invention is therefore a vacuum insulation panel comprising a core according to the invention positioned inside a gastight envelope, generally made of a multilayer plastic film that is aluminized or that incorporates at least one sheet of aluminum, the assembly being placed under vacuum and sealed so that the internal pressure in the envelope is of the order of less than 0.5 mbar.

The webs or sheets assembled to form the core may be identical to one another, or different, in particular due to the characteristics of the fibers forming them. In particular, it is known to form the outer faces of the core with fibers of relatively smaller diameter than the fibers present at the heart of the core, in order not to reduce the risks of piercing the membrane forming the envelope. By way of indication, the fibers forming at least the sheets of the outer faces of the core may have diameters distributed between around 1 μm and around 4 μm, for lengths of from 1 to 5 mm.

The following examples illustrate the invention in a nonlimiting manner.

Fibers having the chemical composition indicated in table 1 below were obtained by flame attenuation fiberizing.

Table 1 also indicates some characteristic temperatures denoted Tx and corresponding respectively to the temperature at which the glass has a viscosity of $10^x$ poise (1 poise=0.1 Pa·s), the values of x being 2, 2.5, 3, 3.5 and 4. All these temperatures are expressed in ° C.

TABLE 1

|  | Example 1 |
| --- | --- |
| $SiO_2$ | 65.0 |
| $Al_2O_3$ | 1.9 |
| $B_2O_3$ | 10.3 |
| $Na_2O$ | 8.8 |
| $K_2O$ | 2.8 |
| MgO | 1.3 |
| CaO | 2.1 |
| BaO | 4.3 |
| SrO | 2.8 |
| Impurities | 0.7 |
| T2 | 1296 |
| T2.5 | 1153 |
| T3 | 1053 |
| T3.5 | 979 |
| T4 | 922 |

The fibers were subjected to a short-term biopersistence test by intratracheal instillation as required by note Q of Directive 97/69/EC. The half-life was less than 40 days.

Sheets of paper intended to be used in filters were manufactured by a papermaking process from the fibers. In terms of filtration properties after wet aging, the performance levels of the sheets obtained are better than those of the sheets obtained from standard (biopersistent) fibers. The mechanical properties (tensile strength, rigidity) are also comparable, or even better.

The glass having the composition of example 1 was also subjected to a hydrolytic resistance test. According to this method, a glass powder ground in order to form a powder with a particle size of 360 to 400 micrometers is immersed in water heated to reflux for 5 hours. After a rapid cooling, the mixture is filtered and the solids contained in the filtrate are measured. The amount of dissolved material expressed in milligrams per gram of glass treated is 40.7.

Table 2 below presents other examples of fibers according to the invention.

TABLE 2

|  | Example 2 | Example 3 | Example 4 |
| --- | --- | --- | --- |
| $SiO_2$ | 60.1 | 63.7 | 63.7 |
| $Al_2O_3$ | 2.1 | 1.8 | 2.8 |
| $B_2O_3$ | 10.8 | 11.0 | 11.0 |
| $Na_2O$ | 9.3 | 8.6 | 9.0 |
| $K_2O$ | 4.0 | 3.2 | 3.2 |
| MgO | 1.2 | 1.3 | 1.3 |
| CaO | 1.8 | 2.0 | 2.0 |
| BaO | 5.1 | 4.2 | 4.3 |
| SrO | 5.5 | 3.0 | 2.3 |
| Impurities | 0.1 | 1.2 | 0.4 |

The invention claimed is:

1. Glass fibers, the chemical composition of which comprises the following constituents, in a weight content that varies within the limits defined below:

| $SiO_2$ | 50-70% |
| --- | --- |
| $Al_2O_3$ | 0-5% |
| CaO + MgO | 0-7% |
| $Na_2O$ | 5-15% |
| $K_2O$ | 0-10% |
| BaO | 2-10% |
| SrO | 2-10% |
| ZnO | <2% |
| $B_2O_3$ | 5-15%. | wherein the chemical composition is free of bismuth oxide and the fibers are adapted for incorporation into paper sheets to be formed into filters or battery separators, wherein the fibers are adapted for incorporation into the paper sheets by placing the fibers in an aqueous suspension on a filter belt, removing liquid from the aqueous suspension by suction, and drying a resulting fibrous sheet.

2. The glass fibers as claimed in claim 1, such that the $SiO_2$ content is within a range extending from 55% to 68%.

3. The glass fibers as claimed in claim 1, such that the $Al_2O_3$ content is within a range extending from 1% to 4%.

4. The glass fibers as claimed in claim 1, such that the CaO content is within a range extending from 1% to 4%.

5. The glass fibers as claimed in claim 1, such that the MgO content is within a range extending from 1% to 3%.

6. The glass fibers as claimed in claim 1, such that the BaO content is within a range extending from 3% to 8%.

7. The glass fibers as claimed in claim 1, such that the SrO content is within a range extending from 2% to 5%.

8. The glass fibers as claimed in claim 1, such that the ZnO content is at most 1%.

9. The glass fibers as claimed in claim 1, such that the $B_2O_3$ content is within a range extending from 8% to 13%.

10. The glass fibers as claimed in claim 1, a mean diameter of which is within a range extending from 0.1 to 3 μm.

11. A sheet of paper comprising fibers as claimed in claim 1 wherein the sheet of paper is made by the placing the fibers in an aqueous suspension on a filter belt, removing liquid from the aqueous suspension by suction, and drying the resulting fibrous sheet.

12. A filter or a battery separator comprising at least one sheet of paper as claimed in claim 11.

13. An insulation panel core, formed by the superposition of a plurality of sheets of paper or webs as claimed in claim 11.

14. A vacuum insulation panel, comprising a core as claimed in claim 13, positioned inside a gastight envelope, generally made of a multilayer plastic film that is aluminized or that incorporates at least one sheet of aluminum, the assembly being placed under vacuum and sealed so that the internal pressure in the envelope is of the order of less than 0.5 mbar.

15. A process for manufacturing a sheet of paper using glass fibers as claimed in claim 1, comprising melting a glass having substantially the same chemical composition as that of said fibers, then fiberizing the glass, followed by the placing the fibers in an aqueous suspension on a filter belt, removing liquid from the aqueous suspension by suction, and drying the resulting fibrous sheet.

16. The glass fibers as claimed in claim 2, such that the $SiO_2$ content is within a range extending from 60% to 67%.

17. The glass fibers as claimed in claim 3, such that the $Al_2O_3$ content is within a range extending from 1.5% to 2.5%.

18. The glass fibers as claimed in claim 4, such that the CaO content is within a range extending from 1.5% to 3%.

19. The glass fibers as claimed in claim 5, such that the MgO content is within a range extending from 1% to 2%.

20. The glass fibers as claimed in claim 6, such that the BaO content is within a range extending from 3% to 6%.

21. The glass fibers as claimed in claim 7, such that the SrO content is within a range extending from 2% to 4%.

22. The glass fibers as claimed in claim 8, such that the ZnO content is zero.

23. The glass fibers as claimed in claim 9, such that the $B_2O_3$ content is within a range extending from 9% to 12%.

24. The process as claimed in claim 15, wherein the fiberizing is done by flame attenuation.

25. Glass fibers, the chemical composition of which comprises the following constituents, in a weight content that varies within the limits defined below:

| | |
|---|---|
| $SiO_2$ | 50-70% |
| $Al_2O_3$ | 0-5% |
| CaO + MgO | 2.5%-5% |
| $Na_2O$ | 5-15% |
| $K_2O$ | 0-10% |
| BaO | 2-10% |
| SrO | 2-10% |
| ZnO | <2% |
| $B_2O_3$ | 5-15%. | wherein the chemical composition is free of bismuth oxide the fibers are adapted for incorporation into paper sheets to be formed into filters or battery separators by placing the fibers in an aqueous suspension on a filter belt, removing liquid from the aqueous suspension by suction, and drying a resulting fibrous sheet.

* * * * *